United States Patent Office 3,183,017
Patented May 11, 1965

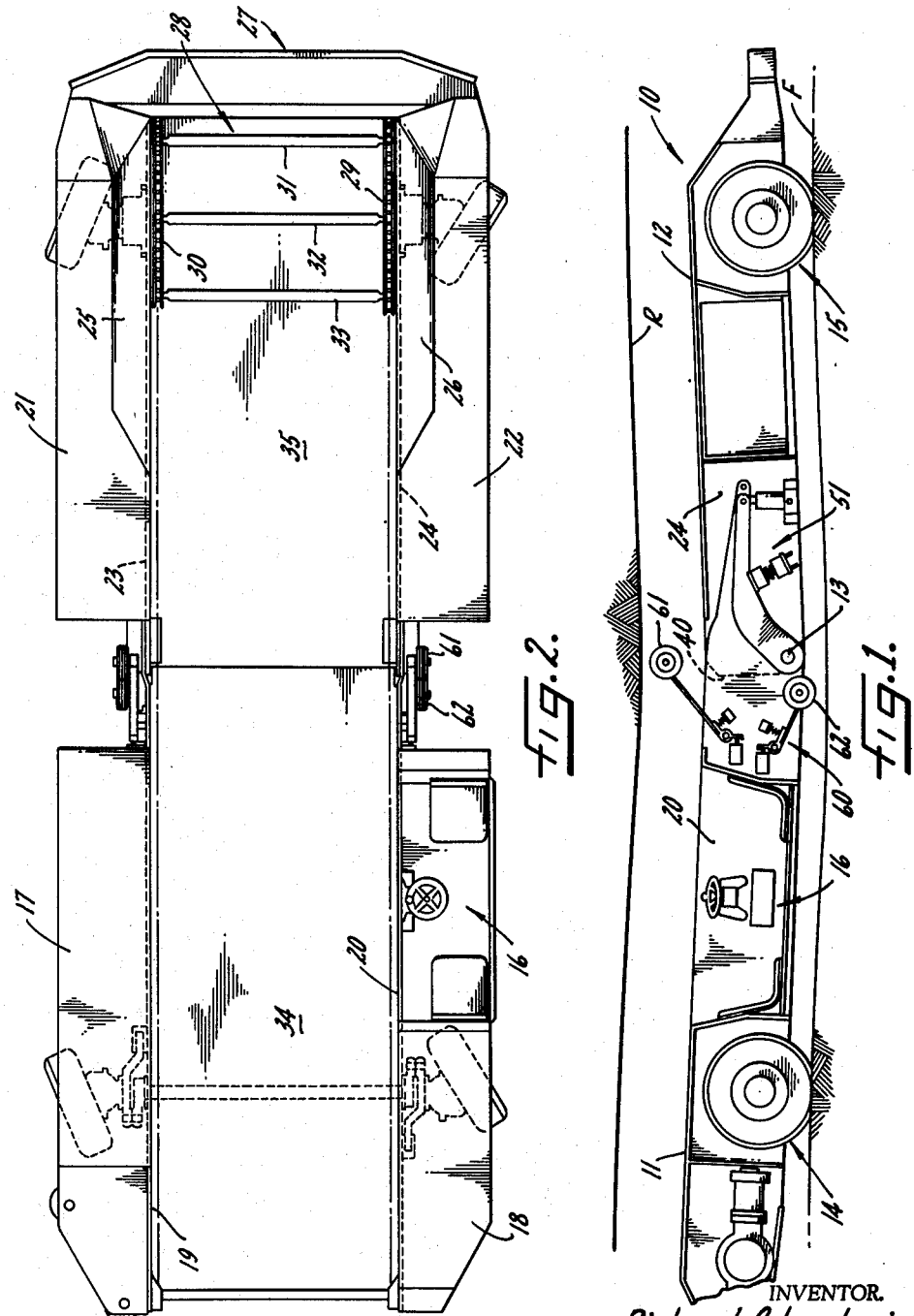

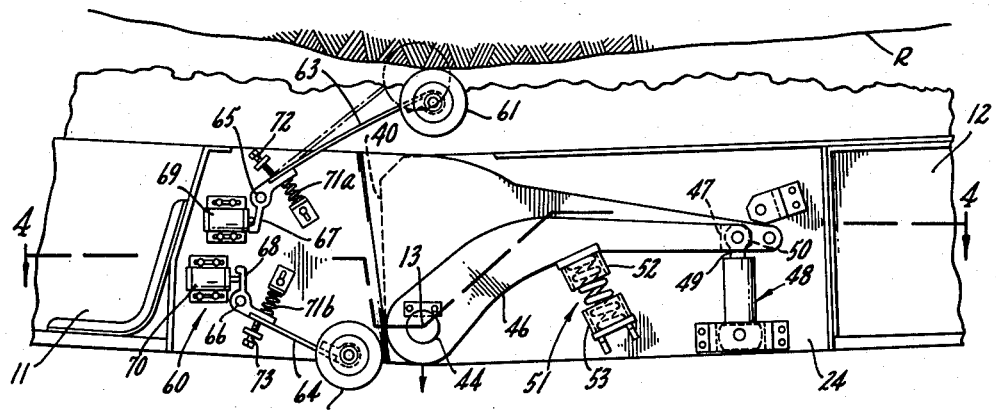

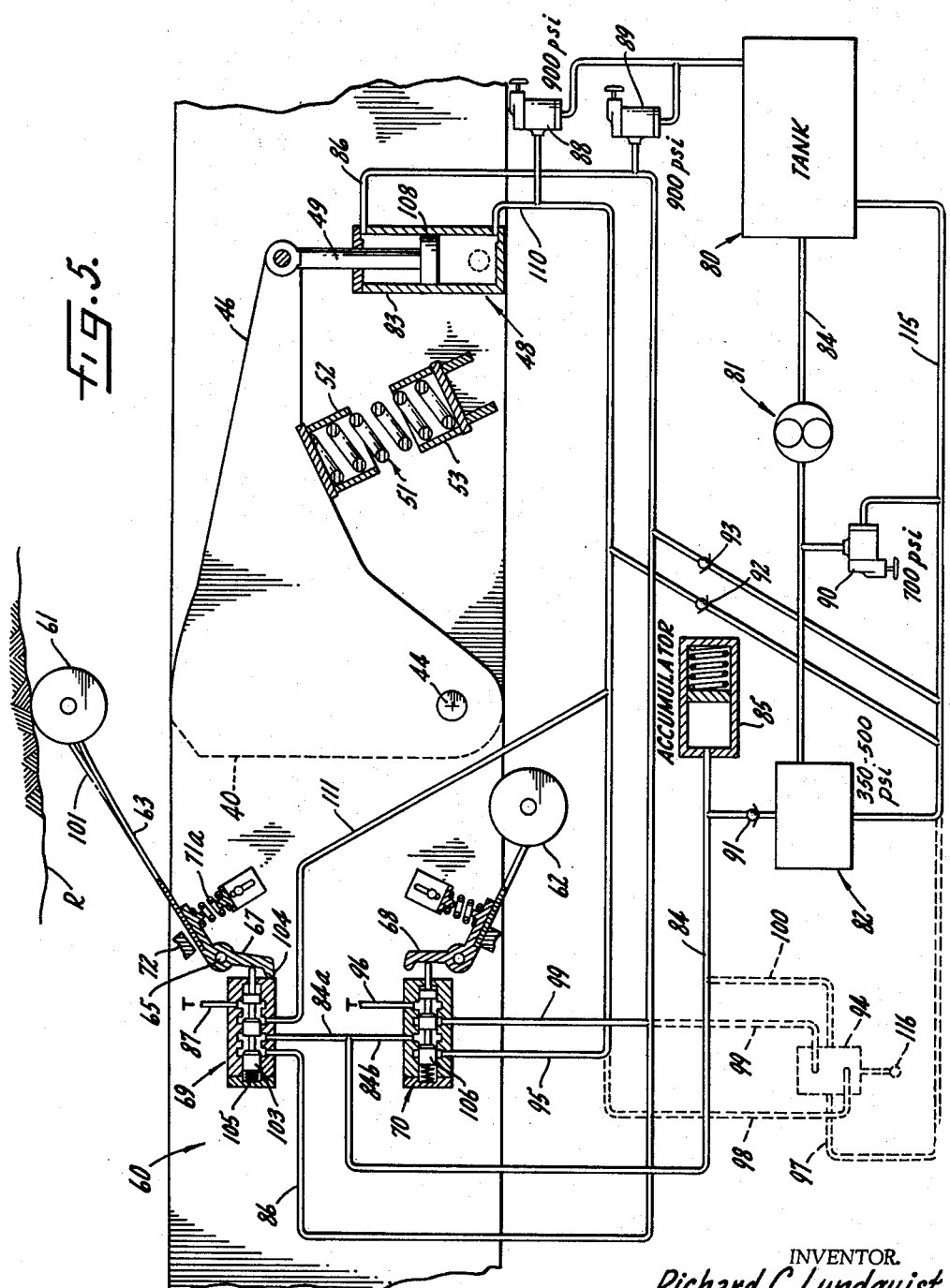

3,183,017
SHUTTLE CAR
Richard C. Lundquist, Palos Heights, Ill., assignor to Goodman Manufacturing Company, Chicago, Ill., a corporation of Illinois
Filed May 1, 1962, Ser. No. 191,631
8 Claims. (Cl. 280—34)

This invention relates generally to haulage vehicles and more specifically to a 4-wheel mine shuttle car.

Shuttle cars used in underground mining, particularly coal mining, are usually 4-wheel or 6-wheel. The 4-wheel car is generally less expensive than a 6-wheel car and slewing of the wheels is not a problem since all of the wheels are positioned substantially perpendicularly to their turning center. Further, the car has a minimum of parts since only a single equalizer is needed and the steering linkage is relatively simple.

One occasional disadvantage of the 4-wheel car is that humping and pinching may occur in mines having irregular roof and floor contours. Humping occurs when the car, which has a rigid frame, passes over a rise in the floor which is equal to or greater than the clearance between the bottom of the car and the mine floor. In this event the car is hung up with one or more wheels lifted out of contact with the ground, and traction correspondingly lost.

Pinching occurs when a downward projection from the roof strikes the rigid car or its load. In a low clearance underground mine seam the car may actually be wedged tightly between the roof and floor. Even if the clearance in insufficient to actually wedge the car between the roof and floor, the load carrying capacity may be substantially reduced because the projection will brush off a portion of the upwardly extending load.

To reduce the possibility of humping and pinching the two sets of wheels are placed inwardly a substantial distance from the ends of the car. Any positioning is however a compromise, for if the wheels are too close together pinching remains a problem whereas if too far apart, humping remains a problem.

Humping and pinching are substantially reduced in 6-wheel cars by making the car in two sections which are pivotable about a generally transverse axis. This axis is usually located midway between the ends of the car, and the steering wheels are located at the car ends. When bumps in the floor or downwardly extending projections from the roof are encountered the car actually pivots a few degrees about the buckling axis. This few degrees of give is generally sufficient to eliminate humping or pinching. At least a third set of wheels located approximately at the buckling axis is required because of the long unsupported, jointed span between the steering wheels. This additional set of wheels increases the complexity of the car and further raises the problem of slewing of the center wheels when the car makes short radius turns.

Accordingly, the primary object of this invention is to provide a mine shuttle car having the best features of the 4 and 6-wheel shuttle cars without the attendant disadvantages of either.

Another object is to provide a 4-wheel mine shuttle car having its wheels located near the ends of the car, as in the 6-wheel car, with the buckling feature of the 6-wheel car.

Yet another object is to provide a system for sensing the presence of irregular roof and floor contours whereby a jointed 4-wheel mine shuttle car may be buckled in the appropriate direction about a buckling axis located approximately at the mid-point of the car to thereby eliminate humping and pinching.

Other objects will become apparent from a reading of the following description of the invention.

The invention is illustrated more or less diagrammatically in the accompanying drawings wherein:

FIGURE 1 is a side elevation of a 4-wheel shuttle car embodying the principles of the present invention;

FIGURE 2 is a top plan view of the shuttle car of FIGURE 1;

FIGURE 3 is a side elevation to an enlarged scale of a portion of the shuttle car of FIGURE 1 illustrating the position of the two halves of the car when a downwardly extending roof projection is encountered;

FIGURE 4 is a partial sectional view taken substantially along the line 4—4 of FIGURE 3;

FIGURE 5 is a view, partly schematic, of a hydraulic system used in the invention;

FIGURE 6 is a diagrammatic view illustrating the position of the jointed portions of the car when a hump in the floor is encountered; and FIGURE 7 is a diagrammatic view illustrating the relative positions of the jointed sections of the car when a downwardly extending roof projection is encountered.

Like reference numerals will be used to refer to like parts throughout the description and drawings.

The shuttle car of the invention is indicated generally at 10 in FIGURE 1. It is shown in an underground mining seam, and from the proximity of the floor F and roof R it will be observed that the seam is relatively narrow which is common in many coal mines.

The car is composed of a forward or discharge section 11 and a rear or loading section 12. The sections are connected to one another about a transverse buckling axis 13. A set of supporting wheels adjacent the discharge end of the car is indicated generally at 14 and a similar set of supporting wheels adjacent the receiving end at 15. From the plan view of FIGURE 2 it will be noted that each wheel in each set of wheels is positioned perpendicularly to its turning arc.

A control compartment is indicated generally at 16. Since the means by which the car is propelled, the cable reel and other conventional components do not form part of the invention they have not been further illustrated or described.

A pair of aprons 17 and 18 extend outwardly from the vertical sides 19 and 20, respectively, of the discharge end 11. A second pair of aprons 21 and 22 extend horizontally outwardly from the side walls 23 and 24, respectively, of the rear or loading section 12. Rear aprons 21 and 22 are troughed as at 25, 26 to provide increased carrying capacity. An overhang, indicated generally at 27, is located at the rear of a conveyor. A slat conveyor is indicated generally at 28. The conveyor consists of a pair of endless orbitally movable chains 29, 30 and slats 31, 32, 33, etc. The slats travel over the flat floors 34, 35 of the discharge and receiving sections 11 and 12, respectively, in a well known manner.

The forward end of rear side wall 24 is indicated at 40. The rear end of left side wall 20 is offset as at 41, and a generally tapering rearwardly extending portion 42 overlaps the forward end of wall 24.

The discharge and receiving halves of the shuttle car are secured to one another about buckling axis 13 by shaft 44. As best seen in FIGURE 4, shaft 44 is received in generally horizontally aligned apertures in side walls 20 and 24. Suitable bearing structure is indicated at 45. Since the particular mode by which the shaft is supported does not form an essential part of the invention, it has not been illustrated in further detail. Suffice to say that it enables the halves of the car to pivot with respect to one another along the substantially transverse axis 13.

Means for buckling the car about shaft 44 are illustrated best in FIGURES 1, 3 and 4. A heavy lever member 46 is journaled on the outer end of shaft 44 and extends rearwardly along the projection 42. The arm is pivotable about shaft 44 along with projection 42 to which it is welded or otherwise suitable secured. The rear end of lever member 46 is cut out as at 47.

A hydraulic jack is indicated generally at 48. The jack cylinder is pivotally secured to side wall 24 by bolts or other suitable means. The outwardly extending free end of piston 49 terminates in an eye bolt 50 which is pin connected to the end of projection 42 and the lever member 46, all as best seen in FIGURES 3 and 4.

A return spring is indicated generally at 51. The upper end of the spring is received in a spring cage 52 secured to and movable with the lever 46, and the lower end is received in a spring cage 53 secured to side wall 24. Spring 51 is so biased that when the two sections 11 and 12 are in their normal, or unflexed condition, the spring is at rest. With sections 11 and 12 in the FIGURE 3 position the spring is in compression. When sections 11 and 12 are in the FIGURE 6 position the spring is extended. A sensing system for indicating the proximity of either the roof or floor is indicated generally at 60. The sensing system includes a pair of sensors, which in this instance are a pair of rollers 61 and 62. Each roller is mounted at the end of a leaf spring 63, 64 respectively. Each leaf spring in turn is pivoted about a pivot pin 65, 66. Valve actuating levers 67 and 68 form the forward ends of the leaf spring 63, 64. Each actuating lever controls a valve 69, 70 which in turn admits fluid to hydraulic jack 48. Return springs for the sensors are indicated at 71a, 71b. The height of the rollers above and below the car may be adjustably set by screws 72, 73.

The hydraulic connections between valves 69, 70 and jack 48 are shown best in FIGURE 5.

A tank is indicated at 80, a pump at 81 and an unloading valve at 82. Line 84, including its branches 84a, 84b, connects the tank, pump, and unloading valve to spool valves 69 and 70. An accumulator is indicated at 85 for increasing the sensitivity of response of the system.

Spool valve 69 is connected by high pressure line 86 to the upper end of jack cylinder 83. A return line emptying into the tank is indicated at 87.

A pair of overload valves are indicated at 88, 89 respectively, a relief valve at 90, reverse flow preventing ball check valves at 91, 92 and 93, and an optional manual control valve at 94.

Spool valve 70 is connected to the lower end of jack cylinder 83 by high pressure lines 95, 110 and to tank by return line 96. Lines 97, 98, 99 and 100 extend from manual control valve 94 to the tank, high pressure line 95, high pressure line 86 and high pressure line 84, respectively.

Purely by way of exemplification and to aid in an understanding of the invention, representative pressure values have been set forth adjacent each valve. Such values should be considered representative only and not limitative.

The use and operation of the invention are as follows:

The necessary clearance above and below the shuttle car is set by adjustment screws 72 and 73. Thus, for example, in order to prevent humping which would occur in a conventional 4-wheel car with a floor contour similar to that shown in FIGURE 6, the lower sensing roller 62 is first set such that its lower ground-contacting surface lies at least a few inches below the bottom of the car. Similarly, the roof-contacting surface of upper sensing roller 61 is so adjusted that the contacting surface is a specified distance, perhaps 2 inches, above the normal level of a full load of coal. A representative setting is shown for the lower sensing roller in FIGURE 7 and for the upper sensing roller in FIGURE 6.

In normal operation the discharging and receiving portions 11 and 12 of the car will be aligned one with the other. This condition is made possible by the action of spring 51 and hydraulic jack 48. Thus, so long as spring 51 is being neither compressed nor extended, it will cause lever arm 46 to remain at a position in which portions 11 and 12 are parallel with one another.

Should the car encounter a downwardly extending projection from the roof, as shown for example in FIGURE 5, the system will function as follows:

Roller 61 and leaf spring 63 will be displaced downwardly from this normal position, indicated generally at 101, to the indicated solid line position. The inner end of leaf spring 63 will move away from adjusting screw 72 compressing return spring 71a. The depression of the leaf spring will cause lever 67 to swing about pivot pin 65 and move spool 103 of spool valve 69 to the FIGURE 5 position. Further travel of the spool is prevented by dog 104 striking the right-hand end of valve 69. It will also be understood that spool valve 69 includes a return spring 105 biased to move spool 103 to a position corresponding to the position of spool 106 of valve 70.

When spool 103 is in the FIGURE 5 position fluid from tank 80 passes through pump 81, unloading valve 82, ball check valve 91 and into the center admission port of spool valve 69 by high pressure line 84, 84a. High pressure branch line 84b opens into the middle port of spool valve 70 but since the spools block the lower outlet ports, no movement of spool 106 will occur. The high pressure fluid from the middle admission port of valve 69 flows through the valve and out high pressure line 86 to the upper end of hydraulic jack cylinder 83. Ball check valves 91, 93 prevent reverse flow, and, so long as the pressure is below the unloading pressure setting of valve 89, the pressure will not be unloaded to tank through valve 89. The high pressure fluid from line 86 against the upper face of piston 108 moves piston rod 49 downwardly. This in turn causes lever arm 46 and extension 42 to move downwardly about shaft 44 against spring 51. This movement causes the discharge and receiving portions 11 and 12 of the car to buckle into the position of FIGURES 3 and 7.

Fluid is exhausted from the underside of piston 108 through lines 110, 111, spool valve 69 and line 87 to tank.

When the downwardly extending roof projection is cleared, sensing roller 61 returns to its normal position 101 and return spring 105 moves spool 103 to a position corresponding to the position of spool 106. In this condition the hydraulic fluid merely circulates from the tank through the pump, through the unloading valve and back to tank.

Should a hump in the floor, as shown in FIGURE 6, be encountered, substantially the same circuit is formed in conjunction with valve 70. Thus fluid from tank 80 and pump 81 passes through unloading valve 82 and into spool valve 70 via high pressure line 84 and branch line 84b. Spool 106 will be in a position corresponding to the illustrated position of spool 103 due to the upward displacement of sensing roller 62 with the resultant leftward movement of lever 68 and spool 106. High pressure fluid entering the top port of valve 70 passes to the lower side of piston 108 via lines 95, 110, and moves lever 46 upwardly about the shaft 44. The upward movement of piston 108 moves the jointed sections to the relative positions of FIGURE 6.

As piston 108 moves upwardly, fluid is exhausted from hydraulic cylinder 83 via line 86 to the lower right-hand port of valve 70 and thence through the valve and return line 96 to the tank.

If both sensing rollers 61 and 62 should be depressed simultaneously, the fluid will merely circulate through valves 69, 70, and back to tank. One path for example will include tank 80, pump 81, unloading valve 82, lines 84 and 84a, through valve 69, line 86, branch pipe 99, through valve 70, and then line 96 back to tank.

When neither sensor 61, 62 is depressed, the fluid will merely follow a path consisting of tank 80, line 84, pump 81, unloading valve 82, and return line 115 to tank. If any make up fluid is required check valves 92 or 93 will be unseated to provide it. Make up may be required for example when the car has been idle for long periods or if cylinders have been scored or packings have small leaks.

The function of accumulator 85 is to make the system instantly responsive to movement of the sensing rollers 61 and 62. Since the shuttle car may travel at rates of speed up to five miles per hour, a substantial volume of fluid may be required in cylinder 83. The combination of accumulator 85 in addition to pump 81 satisfies surge requirements without the use of an oversized pump.

Manual control valve 94 enables the automatic sensing provided by sensors 61, 62 to be overriden at any time. It may be desirable to tilt up the discharge end for example when unloading the car onto a conveyor. Line 100 is an intake, line 97 a return, and lines 98 and 99 admit fluid to the bottom and top of cylinder 83 respectively. By suitable manipulation of handle 116, the car can be kinked or buckled at will. In the neutral position all parts are blocked and the valve is, in effect, cut out of the system.

Although the invention has been illustrated and described in connection with a hydraulic sensing system, it should be understood that the invention is not so limited and that variations will be at once apparent to those skilled in the art. It is contemplated, for example, that the hydraulic system of FIGURE 5 may be replaced by an electric circuit in which depression of a roller or other sensor closes an electrical circuit to a solenoid which in turn operates an appropriate cylinder which allows the car to buckle in the appropriate direction to clear the impediment.

Although a preferred and alternative embodiment of the invention have been illustrated and described, it will be apparent to one skilled in the art that other variations may be made within the spirit and scope of my invention. Accordingly it is my intention that the scope of my invention should only be limited by the scope of the pertinent prior art and the following appended claims.

I claim:
1. A haulage vehicle, said haulage vehicle including, in combination
   a body having end portions, said body being jointed intermediate its ends about a substantially transverse axis to thereby enable it to buckle to conform to irregularities in adjacent surfaces,
   a set of supporting wheels mounted adjacent each end portion of the body, each set of supporting wheels being located a substantial distance from the buckling axis,
   and buckling means effective to buckle the jointed body in response to the presence of an overlying or underlying surface closer than a predetermined distance from the body,
   said buckling means including a sensing system effective, in response to the presence of an irregularity in an adjacent surface, to physically sense the irregularity and thereafter initiate buckling of the body.

2. A mine shuttle car, said car including, in combination
   a body, said body being jointed about a buckling axis approximately midway between its end portions to thereby form a section on each side of the axis,
   two sets of supporting wheels, one at each end portion of the car,
   and buckling means automatically operable in response to the presence of an adjacent surface within a predetermined distance from the jointed body to buckle the body about the buckling axis, and to return the body to its normal condition when the adjacent surface is located further than the predetermined distance from the jointed body,
   said buckling means including a hydraulic sensing system and a hydraulic jack, said jack being carried by one section of the jointed body, said hydraulic sensing system having a sensor which, upon physical contact with an irregular surface, actuates the hydraulic jack,
   said jack having a reciprocable piston connected to the other half of the jointed body whereby the jointed body is buckled about its buckling axis upon reciprocation of the piston.

3. The mine shuttle car of claim 2 further characterized in that the sensor, when out of contact with the surface irregularity, releases the hydraulic jack,
   and further including spring means biased to return the jointed sections of the car to a substantially unflexed condition upon release of the hydraulic jack.

4. The mine shuttle car of claim 3 further characterized by and including a second sensor, one of the sensors being mounted to contact a roof and the other of said sensors being mounted to contact a floor, said sensors being effective to actuate the jack in opposite directions.

5. The mine shuttle car of claim 3 further characterized in that the free end of the hydraulic jack piston is pivotally connected to an extension integral with the section opposite that section to which the jack is mounted.

6. The mine shuttle car of claim 4 further including manual override means effective, in response to manual control, to buckle the car in any desired direction independently of the automatic system.

7. A haulage vehicle, said haulage vehicle including, in combination,
   a body having end portions, said body being jointed intermediate its ends about a substantially transverse axis to thereby enable it to buckle to conform to irregularities in adjacent, generally vertically disposed surfaces,
   a set of supporting wheels mounted adjacent each end portion of the body,
   said buckling axis being located a substantial distance from any set of supporting wheels,
   and buckling means effective to buckle the jointed body in response to the presence of a generally vertically disposed surface which is closer than a predetermined distance from the body.

8. A mine shuttle car, said car including, in combination
   a body, said body being jointed about a buckling axis located intermediate its end portions to thereby form a section on each side of the buckling axis,
   two sets of supporting wheels, one at each end portion of the car,
   said buckling axis being disposed a substantial distance from the nearest set of supporting wheels,
   and buckling means automatically operable in response to the presence of a surface within a predetermined, generally vertical distance from the jointed body to buckle the body about the buckling axis, and to return the body to its normal position when the surface is located further than the predetermined, generally vertical distance from the jointed body.

References Cited by the Examiner

UNITED STATES PATENTS

| 2,761,666 | 9/56 | Heimaster | 299—1 |
| 3,008,592 | 11/61 | Johnson | 214—83.36 |

FOREIGN PATENTS 887,800  1/62  Great Britain.

PHILIP ARNOLD, *Primary Examiner.*

A. HARRY LEVY, *Examiner.*